United States Patent Office 3,556,812
Patented Jan. 19, 1971

3,556,812
CHOCOLATE MARSHMALLOW AND PROCESS FOR PRODUCTION THEREOF
Harvey Berton Krohn, Rahway, and Fred J. Polito, Colonia, N.J., assignors to The Quaker Oats Company, Chicago, Ill., a corporation of New Jersey
No Drawing. Filed Mar. 14, 1968, Ser. No. 712,938
Int. Cl. A23g 3/00
U.S. Cl. 99—134                             4 Claims

ABSTRACT OF THE DISCLOSURE

A process for producing chocolate marshmallow comprising the steps: (A) preparing a marshmallow mix; (B) aerating the marshmallow mix under gas pressure until the density of the mixture at atmospheric pressure is from 30 to 74 ounces per gallon; (C) uniformly injecting from 2 to 15 percent by weight of high pressure, liquid, high-fat-content chocolate into the aerated mixture; (D) folding the mixture to uniformly blend the chocolate therein; and (E) reducing the pressure to atmospheric pressure before the density of the product at atmospheric pressure exceeds 74 ounces per gallon.

A marshmallow product having a high-fat-content chocolate uniformly incorporated therein. The product has from 1 to 8.5 percent by weight cocoa butter fat content, and the product has a density of from 30 to 74 ounces per gallon.

BACKGROUND OF THE INVENTION

Field of the invention

This invention relates to chocolate marshmallow and a process for the production thereof.

Description of the prior art

Marshmallow is an aerated food product usually composed of various saccharides, water, gelatin, and flavoring agents. Although optional, marshmallow may also contain edible food coloring and other minor edible ingredients such as edible humectants.

Marshmallow syrup is the mixture of ingredients that is aerated and whipped to form marshmallow. By use herein of the terms "marshmallow mix" and "marshmallow syrup," we intend to refer to a marshmallow syrup. Depending on the method for marshmallow production, marshmallow syrup usually has a moisture content of about 16 to 30 percent by weight, very little of which is lost in processing. A more detailed description of marshmallow syrup is found later on in this discussion.

Marshmallow syrup generally has a density of approximately 127 ounces per gallon. In the production of marshmallow, marshmallow syrup is whipped and intermixed with an inert, edible gas such as air or nitrogen until the density of the mixture is approximately 44 ounces per gallon. This volumetric expansion, i.e. volume increase of 2 to 3 times, gives marshmallow the characteristic spongy texture which consumers desire. In fact, these spongy and low-density texture characteristics are so common to marshmallow that consumers will not accept a product lacking in them.

Many different flavoring agents have been utilized to alter the taste of marshmallow. These flavoring agents have heretofore been required to have low fat contents and be used in such small quantities that the final marshmallow product has a very low fat content, i.e. usually below 1.0 percent by weight fat. This low fat content has been required in order to prevent excess fat from precluding expansion during whipping and aeration. Since the marshmallow whip is essentially a mixture of ingredients mixed with and whipped with water, very small quantities, i.e. above 1% by weight, of fats or oils have heretofore broken this whip preventing the required product expansion. This is obvious since oils or fats and water do not readily mix and thus would not be thought to be a combination which could be whipped. While some attempts have been made to increase the oil or fat level in marshmallow, these attempts have generally been through the addition of certain additives which prevent the oil from breaking the emulsion or whip. While these attempts have met minor success in providing incremental increases in fat content, the additional additives have created an off-taste or foreign taste which has made the marshmallow product unacceptable.

Chocolate is among the most popular flavors, especially for children. Since chocolate is a very popular flavor, it is desirable to produce a chocolate flavored marshmallow product. Methods heretofore known for producing chocolate flavored marshmallows have each utilized some type of artificial or synthetic chocolate flavor. This has been made necessary because chocolate is very high in fat content, i.e. over 50 percent by weight fat (cocoa butter), and inclusion of significant amounts of such a high fat content material to a marshmallow mix was thought to result in destruction of the whipping properties of the mix as is hereinabove described. Prior known methods, therefore, have not utilized chocolate as a flavoring agent or else have not utilized appreciable amounts of it. Regardless of the flavoring agent used, it has been previously thought necessary to use a low fat content flavoring agent, i.e. below about 20 percent by weight fat, and use the fat containing flavoring agent in such a small amount, i.e. usually a maximum of about 1.0 percent by weight of the fat containing material, that the final marshmallow product has no appreciable fat in it. Low fat content synthetic flavors have also been used to give a chocolate-like flavor to marshmallows, but these flavoring devices also usually have an adverse taste as is hereinabove described.

Minor amounts of cocoa, i.e. from 0.5 to 1.0 percent by weight, have been used to give a chocolate-like flavor to marshmallow. While flavoring by cocoa has probably been the most successful of the attempts for making chocolate marshmallow, it has still not produced a true chocolate flavor. This is attributed to the fact that cocoa is low in fat content, i.e. usually from 10 to 20 percent by weight cocoa fat. Chocolate, on the other hand, has a minimum of 50 percent by weight fat content, the fat content being comprised primarily of cocoa butter or cocoa fat. Since cocoa fat or cocoa butter provides some of the characteristic taste of chocolate, and since removal of the cocoa butter from chocolate involves certain processing which apparently destroys, the characteristic chocolate taste, and since cocoa is by definition chocolate having most of the cocoa butter fat removed, cocoa has not provided an acceptable flavoring agent for producing chocolate flavored marshmallow.

At least one attempt has been previously made to provide a marshmallow product having chocolate or fats therein. U.S. Patent No. 2,171,244 to Otterbacher, Aug. 29, 1939, includes chocolate in a marshmallow-like formula. The product of that invention, however, was described as "having some of the characteristics of a fondant but being lighter than fondants and some of the characteristics of marshmallow but being considerably heavier and denser than marshmallow." While this heavy, dense fondant-like chocolate material may be desirable as a candy-type product, the production of the product has admittedly utilized chocolate or fat to greatly increase the density of the product until it no longer has the texture characteristics of marshmallow. This further illustrates that prior known processes have been established with the idea that inclusion of significant amounts of chocolate or fat therein destroys the whippability and the expanded, sponge-like texture that is characteristic of marshmallow. It is thus seen that prior known methods have failed to produce a marshmallow product having significant amounts, i.e. from 2 to 15 percent by weight, of chocolate therein and still having a density which provides a texture which is characteristic of marshmallow, i.e. a density of from 30 to 74 ounces per gallon.

As illustrated in the above discussion, it has become apparent to the marshmallow industry that it would be highly desirable to have a marshmallow product which contains significant amounts of true chocolate. It has also become apparent to the marshmallow industry that the high fat content of chocolate makes it an ingredient that would be impossible to include in significant amounts in marshmallow. There has thus existed a long felt need for a process which can produce a marshmallow product containing significant amounts of chocolate. We have provided a process which fulfills this long felt need.

SUMMARY OF THE INVENTION

It is an object of this invention to provide a process for producing chocolate marshmallow.

It is a further object of this invention to produce a marshmallow product that has true chocolate flavor and still maintains the density and texture characteristics of marshmallow.

The objects of this invention are accomplished by a marshmallow product having a high-fat-content chocolate uniformly incorporated therein, said marshmallow product having a cocoa butter fat content of from 1 to 8.5 percent by weight, and said marshmallow product having a density of from 30 to 74 ounces per gallon.

The objects of this invention are further accomplished by a process comprising the steps:

(A) Preparing a marshmallow mix;

(B) Aerating the marshmallow mix under gas pressure to provide a gas-containing mixture having a density at atmospheric pressure of from 30 to 74 ounces per gallon;

(C) Uniformly injecting from 2 to 15 percent by weight, based on the total weight of the mixture, of a high-fat-content chocolate into the gas-containing mixture, said high-fat-content chocolate being injected in the liquid state, and said high-fat-content chocolate being injected at a pressure above the pressure of the gas-containing mixture;

(D) Folding the chocolate and gas-containing mixture to uniformly blend the chocolate therein and create a uniformly blended mixture; and (E) Reducing the pressure of the uniformly blended mixture to substantially atmospheric pressure, said pressure being reduced before the density at atmospheric pressure of said uniformly blended mixture exceeds 74 ounces per gallon, and said reduction of pressure producing a sponge-like chocolate marshmallow product.

In addition to the nomenclature that is well known to the candy and marshmallow art, certain other terms and definitions are helpful in further defining our invention. These include the following:

Chocolate: Cocoa beans are roasted, crushed, and deshelled. The remaining cleaned and broken pieces of the cotyledon are known as cocoa nibs. These nibs are alkali treated. (Dutch processing), roasted, and dried. The roasted or dried nibs are then ground, and the heat of grinding melts the fat in the nibs as well as grinding the cell wall of the nibs. The ground cell walls suspended in the fat produce a slurry which is the chocolate herein referred to by the term "chocolate." U.S. Government standards require chocolate to have a minimum of 50 percent by weight fat content. The terms "chocolate" and "high-fat-content chocolate" as used herein refer to the above described product, and the term "high-fat-content" as used in conjunction with the term "chocolate" simply indicates a chocolate having a minimum fat content of 50 percent by weight.

It is to be understood, however, that while we have hereinabove defined one process for the production of chocolate, other types of chocolate made by other processes are equally acceptable. In other words, we do not intend to limit the definition of the chocolate used herein to Dutch processed chocolate.

Gelatin: By use of the term "gelatin" we mean a glutinous material obtained from animal tissues by prolonged boiling or any of the various substances resembling gelatin in physical properties. Gelatin is sold on the basis of Bloom test or jelly test, the testing methods of which are described in AOAC Official Methods of Analysis, 10th Edition, 1965, pages 325–326. Gelatin having a Bloom test or jelly test of from 150 to 300 grams is normally considered acceptable for marshmallow production. It is usually preferred, however, to use from 1.5 to 2.5 percent by weight of a gelatin having a Bloom test of from 225 to 250 grams with variations in Bloom test values being compensated for by using less gelatin as the Bloom test value increases.

Marshmallow syrup: By use of the term "marshmallow syrup" we intend to mean the mixed ingredients which are whipped and aerated to produce mashmallow. By use of the term "marshmalolw mix" we intend to refer to a marshmallow syrup.

Gas pressure: By use of the term "gas pressure" we intend to refer to a mixture which is under pressure and which has had a gas injected into it. The gas is injected into the mixture at a pressure substantially above atmospheric pressure and is used to aerate the mixture.

The first step of our process consists of preparing a marshmallow mix. This marshmallow mix consists of an intimate mixture of all the ingredients normally contained in the marshmallow. The ingredients used in marshmallow production as well as the amounts thereof are well known to the candy and marshmallow industry. Among the many formulas that are acceptable for marshmallow production are those found in the following: Candy Making as a Science and an Art, by Claude D. Barnett, Don Gussow Publications, Inc., N.Y. (1960), pages 99–103; An Encyclopedia of Candy and Ice-Cream Making, by Simon I. Leon, Chemical Publishing Co., N.Y. (1959), pages 294–304; and A Text Book on Candy Making, by Alfred E. Leighton, The Manufacturing Confectioner Publishing Co., Oak Park, Ill. (1952), pages 55–68. A typical such formula would include about 40 to 50 percent by weight sugar, about 15 to 25 percent by weight water, about 20 to 30 percent by weight corn syrup, about 2 to 10 percent by weight invert sugar, and about 1 to 4 percent by weight gelatin. The typical formula may also include some alterations of the formula such as replacing part or all of the sugar with corn syrup and replacing part or all of the invert sugar with invert syrup. Various flavoring agents and humectants may also be added in minor amounts. For our marshmallow product, however, we prefer to use a mixture comprising in weight percentages about 20.1 percent sugar, 18.3 percent water, 1.2 percent gelatin, 51.0 percent corn syrup (44° Baumé), 9.0 percent invert syrup, and 0.4 percent other ingredients such as flavoring, milk protein, coloring, and preservative. To 100 parts of this mixture, we would prefer to add about 5.75 parts by weight chocolate in our process. It is to be understood that the marshmallow mix is an intimate and thorough mixture of the ingredients used therein. This is especially critical with regards to the gelatin which must be completely dissolved in the other ingredients in order that it may impart the desired whippability to the mix.

The second step in our process comprises aerating the marshmallow mix under gas pressure to provide a gas-containing mixture having a density at atmospheric pressure of from 30 to 74 ounces per gallon. This step provides for aerating and whipping the marshmallow mix until it has the density that is characteristic of marshmallow, i.e. from 30 to 74 ounces per gallon at atmospheric pressure. While this broad density range provides a characteristic marshmallow density, we prefer to use a more limited density range such as 35 to 48 ounces per gallon, with the most desirable density being about 42 ounces per gallon.

Aeration of the marshmallow mix is accomplished by injecting gas into the mixture and/or whipping the mixture. By the term "aerating the marshmallow mix under gas pressure" we intend to mean whipping the marshmallow mix under pressure while concurrently injecting a gas into the mix. The gas that is injected into the marshmallow mix must be edible, i.e. non-toxic, must be relatively inert in the presence of the ingredients of the marshmallow mix, and must be substantially insoluble in the marshmallow mix. Normally, the gas is injected into the marshmallow mix under pressure. Since normal operations provide for the marshmallow mix to be under pressure during aeration, the gas must be injected at a pressure above the pressure of the mix. We prefer to aerate the marshmallow mix at a pressure of from about 40 to 60 p.s.i.g. and inject the gas at a pressure of from about 50 to 75 p.s.i.g. above the aeration pressure, i.e. at a gas pressure of from about 90 to 135 p.s.i.g. It is not uncommon, however, for much higher gas pressures to be used. Known processes, for instance, use gas pressures up to 450 p.s.i.g., and such aeration processes are acceptable for use in our process.

Aeration of marshmallow is well known to the marshmallow industry, and any of the well known aeration methods and techniques are acceptable for our invention as long as they provide the desirable density decrease in the marshmallow mix. For this step of our process, however, we prefer to use an Oakes type continuous marshmallow mixer and beater, a full description which is found in U.S. Pat. No. 2,600,569. The use and operation of the Oakes type mixer is well known to the marshmallow industry, but we prefer to operate the mixer such that a marshmallow syrup having a density of about 105 to 110 ounces per gallon is whipped and aerated to a density of about 35 to 50 ounces per gallon. For such an aeration step, we prefer to accomplish the whipping and aeration at a pressure of from about 40 to 60 p.s.i.g. and at a temperature of from about 80° F. to 90° F. It is to be understood, however, that the above discussion merely exemplifies our preferred conditions and that any commercial whipping and aeration step is acceptable as long as it provides sufficient aeration to decrease the density of the marshmallow mix to from 30 to 74 ounces per gallon (density measured at atmospheric pressure). It is also to be understood that when referring to density of the product herein, we are referring to the density at atmospheric pressure, i.e. gas pressure removed, unless we so state otherwise.

The next step of our process comprises uniformly injecting from 2 to 15 percent by weight, based on the total weight of the mixture, of a high-fat-content chocolate into the gas-containing mixture, said high-fat-content chocolate being injected in the liquid state, and said high-fat-content chocolate being injected at a pressure above the pressure of the gas-containing mixture. It has heretofore been discussed that inclusion of high-fat-content chocolate, i.e. inclusion of significant amounts of cocoa butter fat, is necessary in achieving a true chocolate flavor. It has also been discussed that heretofore the marshmallow industry has thought it necessary to avoid high fat contents in marshmallow products, i.e. maintain the fat or oil level below 1 percent by weight. We have found however that our process makes possible the inclusion of from 2 to 15 percent by weight chocolate in the marshmallow product. While from 2 to 15 percent by weight chocolate makes an acceptable product, we prefer to inject from 4 to 7 percent by weight chocolate into the marshmallow mix. Inclusion of these critical amounts of chocolate, i.e. from 2 to 15 percent by weight, based on the total weight of the mixture, in the marshmallow product results in a product which has a true chocolate taste without the adverse taste associated with other additives.

In the injection step of our process, the chocolate must be injected in an amount of from 2 to 15 percent by weight based on the total weight of the mixture. As is more fully discussed herein, a minimum of 2 percent by weight chocolate must be injected into the marshmallow mixture in order to significantly impart a truly chocolate flavor to the mixture. Also, the chocolate must not be injected in an amount greater than 15 percent by weight based on the total weight of the mixture. This is necessary primarily because while we have found a process for injecting chocolate into marshmallow without destroying the whip of the marshmallow, there is a point at which the fat content is so high that inclusion of additional fatty substances will begin to significantly destroy the whip. We have found that point to be about 15 percent by weight chocolate. It is clear, therefore, that our process requires the injection of the critical amounts of from 2 to 15 percent by weight chocolate.

The injection step of our process must be conducted in such a manner that the chocolate is uniformly injected into the gas-containing marshmallow mixture. Any uniform injection method is acceptable for this step so long as the chocolate is uniformly injected into the mixture. Also, the injection step must not be so severe or agitating that the aeration or whip of the marshmallow is destroyed. While many different injection methods can be utilized in our invention, we prefer to pass the pressurized marshmallow mixture through an orifice or pipe and inject the chocolate through a plurality of jets placed in the orifice or pipe. By using such an apparatus, we can control both the flow of the marshmallow mix and the flow of chocolate, and we can regulate both to give the desired uniform mixture.

The injection step of our process requires that the injected chocolate be in the liquid state, i.e. it must be melted or freely flowable. While solid chocolate could be uniformly injected into the aerated mixture, it would cause cooling of parts of the aerated mixture resulting in a product of nonuniform density. The most desirable temperature for the chocolate prior to injection would be at the temperature or slightly above the temperature of the aerated mixture. We prefer, therefore, to maintain the aerated marshmallow mixture at a temperature of from about 80° F. to 90° F. and inject the chocolate into the mixture at a chocolate temperature of from about 86° F. to 95° F.

The uniform injection step of our process requires that the high-fat-content chocolate be injected at a pressure above the pressure of the gas-containing mixture. It is necessary to inject the chocolate into the marshmallow mixture while the marshmallow mixture is under pressure. This is required because reduction of the pressure on the marshmallow mixture causes it to expand or "puff" and begin to set, both properties of which make it very difficult or impossible to uniformly inject the chocolate therein and to blend the chocolate therein once the chocolate has been injected into the marshmallow mixture. The resulting combination of high-fat-content chocolate and marshmallow mixture would thus be at a pressure substantially above atmospheric pressure and not yet "puffed" or "set." It is necessary, also, that the pressure of the chocolate be at or slightly above the pressure of the marshmallow mixture in order for the chocolate to be injected into the marshmallow mixture. We prefer to maintain the marshmallow mixture at a pressure of from 40 to 60 p.s.i.g. and to inject the chocolate therein at a chocolate pressure of from about 40 to 80 p.s.i.g. with the chocolate pressure being at or above the pressure of the marshmallow mixture and the chocolate pressure being so regulated as to make possible the injection of from 2 to 15 percent by weight of chocolate. It is obvious that some regulation of this pressure is necessary as the chocolate becomes more or less fluid due to temperature fluctuations. By use of the term "at a pressure above the pressure of the gas-containing mixture," we therefore intend to mean at a pressure at or above the pressure of the gas-containing mixture and at a pressure which makes possible the injection of from 2 to 15 percent by weight chocolate (and preferably from 4 to 7 percent by weight chocolate). It is to be recognized that while we are conducting this step of our process at superatmospheric pressure, at no point in our process should the temperature or pressure of the processing be so severe or extreme as to destroy the whip properties of the product or cause degradation thereof. It is also to be understood that since the injection step of our process is one which combines a high fat content material with a marshmallow mixture, the injection and mixing thereof of the chocolate and marshmallow must not be so severe as to destroy the whip of the marshmallow. This necessarily means that once the chocolate is injected into the marshmallow mixture, the combination must not be severely mixed, agitated, or conveyed in such a manner as to destroy the whip of the marshmallow mixture.

The next step of our process comprises folding the chocolate and gas-containing mixture to uniformly blend the chocolate therein and create a uniformly blended mixture. This step is extremely important in our process for it is here that the high-fat-content chocolate and the marshmallow mixture must be mixed and blended until the chocolate is substantially uniformly dispersed in the mixture, and yet this blending and mixing must be accomplished in such a manner that the marshmallow whip (and the resulting marshmallow texture) is not impaired or destroyed. By use of the term "folding" we therefore intend to mean a gentle and quick mixing and blending which rapidly disperses the chocolate in the marshmallow mixture without destroying the whip of the marshmallow mixture.

The folding step of our process can be accomplished by any of the well-known mixing or blending procedures as long as certain standards are met. First, the folding step must never be so severe or lengthy that the marshmallow product loses its whip. More specifically, the folding step must be such that at any point in time during the step a sample of the product exposed to atmospheric pressure will have a density not exceeding 74 ounces per gallon. Likewise, it may be seen that the folding step must also not aerate the product to decrease its density below 30 ounces per gallon. Any blending step may therefore be used as long as the other standards are met and the density of the product at atmospheric pressure is maintained between 30 and 74 ounces per gallon (and preferably between 35 and 48 ounces per gallon). Since density is one standard by which the product is measured, an established system of sampling and density analysis provides a suitable means for regulating and adjusting the folding step of our process.

It is to be understood that the folding step of our process is under superatmospheric pressure. Since the aeration and injection steps of our process are conducted under pressure, as is hereinbefore discussed, it is necessary that this pressure be maintained during the folding step. Any substantial reduction of this pressure would consequently cause "puffing" or "setting" of the product making it unworkable and causing the folding step to be most difficult if not impossible.

It must be emphasized that the folding step of our process must not be so severe or lengthy as to destroy the whip of the product. It has hereinbefore been discussed that high fat content materials tend to destroy the whip of marshmallow when mixed therewith. The folding step must therefore be mild and quick in order not to destroy the whip of the product. It must still be remembered, though, that while the folding step must be mild and quick, it must also be sufficient to blend the chocolate and marshmallow to the extent that the color, taste, and texture of the mixture becomes substantially uniform throughout. For our folding step, we prefer to fold or blend the chocolate and marshmallow in a paddle-type blender of the 3 inch diameter blending chamber size. We have found that a blender speed of about 173 r.p.m. with a residence or blend time of about 1–3 seconds is desirable for our process. As may be ascertained from previous steps, our folding step is also conducted at a pressure of about 40 to 60 p.s.i.g. and a temperature of about 80° F. to 90° F. This quick and gentle folding step provides us with a uniform product in which the desired density or whip has not been destroyed.

The final step in our process comprises reducing the pressure of the uniformly blended mixture to substantially atmospheric pressure, said pressure being reduced before the density at atmospheric pressure of said uniformly blended mixture exceeds 74 ounces per gallon, and said reduction of pressure producing a sponge-like chocolate marshmallow product. This step of our process provides for the reduction of the pressure that has been applied to the marshmallow product from the aeration step throughout the process. As soon as the pressure on the product is reduced to substantially atmospheric pressure, the product begins to "set" and become ready for consumption. Also, it is the pressure reduction step that allows the aeration gas to escape from the product causing the product to expand or "puff" until it has the density and soft, bouncy, sponge-like texture associated with marshmallow.

The pressure reduction step of our process can be accomplished by mere submission of the product to atmospheric pressure, or it can be accomplished in conjunction with any of the well known marshmallow-depositing and/or forming operations. Regardless of the method used, the pressure reducing step must be conducted according to certain standards. First, the pressure reduction must be to substantially atmospheric pressure. This is necessary to assure that the product sets with the form, density, and texture that it will have at the consumption level. Secondly, the pressure reduction must be such that desired product density is achieved. It has hereinbefore been discussed that the mixture of a high-fat-content chocolate and marshmallow must be carefully and specially handled to prevent the fat in the chocolate from destroying the whip of the marshmallow. These requirements must likewise be maintained in this step of our process until the pressure is reduced to substantially atmospheric pressure.

The pressure reduction step of our process is bound by one further condition: the pressure must be reduced to substantially atmospheric pressure before the density of the product begins to exceed 74 ounces per gallon. This means that regardless of whatever temperature, pressure, mixing, and conveying conditions are used, as well as the time delays for each, the pressure must be reduced before the density of the product exceeds 74 ounces per gallon. Since the density of the marshmallow product indicates whether or not any of the processing variables have had too extreme or too adverse an effect on the marshmallow whip or on the high-fat-content chocolate and marshmallow mixture, each of the variables may be adjusted to provide the desired marshmallow product density. In such a case, a systematic procedure of product sampling may be used to control the necessary variables. Regardless of the system used, the pressure reduction step of our process must be such that the chocolate marshmallow product has a density (measured at atmospheric pressure) of from 30 to 74 ounces per gallon and preferably from 35 to 48 ounces per gallon. The product so produced in accord with our process can be adapted to a wide variation of uses such as fillings and coatings, or it may also be formed into the shape and form commonly associated with marshmallow.

Our new and unique process makes possible a new and unique product not heretofore known. Our process makes possible the first known product having substantial amounts of chocolate incorporated therein and still maintaining the characteristic marshmallow density. More particularly, our process provides the first known marshmallow product having a high-fat-content chocolate uniformly incorporated therein, with said marshmallow product having a cocoa butter fat content of from 1 to 8.5 percent by weight, and with said marshmallow product having a density of from 30 to 74 ounces per gallon.

The cocoa butter fat content of our new product is from 1 to 8.5 percent by weight and preferably from 2 to 6 percent by weight. As is hereinbefore discussed, it is primarily the cocoa butter fat content that determines true chocolate flavor or taste. It is believed that our product is the first marshmallow product to contain significant amounts of cocoa butter fat, and thus our product is the first truly chocolate flavored marshmallow product. The cocoa butter fat content levels described to be critical herein represent the amount of cocoa butter fat that is present when our product contains from 2 to 15 percent by weight chocolate, i.e. chocolate by definition has a minimum cocoa butter fat content of 50 percent by weight and, commercial chocolate usually has a maximum cocoa butter fat content of about 56 to 58 percent by weight.

In addition to the critical amounts of cocoa butter fat in our product, our new and unique product must also have a density of from 30 to 74 ounces per gallon and preferably from 35 to 48 ounces per gallon. As is hereinbefore discussed, this density requirement is necessary in order that the consumer will accept the product as marshmallow. Our product is therefore new and unique in that it is a marshmallow product having both a high-fat-content chocolate incorporated therein and a characteristic marshmallow density and texture. Our product has thus supplied the market with its first truly chocolate flavored marshmallow.

DESCRIPTION OF THE PREFERRED EMBODIMENT

Our new and unique process and product may be more fully described and explained but is not limited by the following example which constitutes the preferred embodiment of our invention.

EXAMPLE

A color premix was prepared by dissolving 0.046 part by weight of dark coloring agent in 0.164 part by weight hot water. The premix was then allowed to cool while awaiting inclusion in the process. This premix will hereinafter be known as the "color premix."

A gelatin mix was prepared to insure that the gelatin would be completely dissolved in, and uniformly distributed in, the marshmallow mixture. For this mixture, 0.927 part by weight of gelatin (Bloom test strength=250 gm.) was added to a first jacketed kettle containing 8.2 parts by weight water. The gelatin was allowed to soak in the water for 5 minutes and then steam was introduced into the jacketed section of the kettle until the temperature of the mixure was 145° F. While maintaining the temperature at 145° F., the mixture was stirred until all the gelatin was dissolved in the water. This mixture was then set aside for inclusion in the process. This mixture will hereinafter be referred to as the "gelatin mix."

A mallow premix was prepared in a second jacketed kettle. For the mallow premix, 8.3 parts by weight water, 0.067 part by weight preservative, 69.0 parts by weight corn syrup (44° Baumé), 8.2 parts by weight invert syrup (42 percent by weight invert sugar), 0.046 part by weight flavoring (vanilla), 0.186 part by weight hydrolyzed milk protein, and the 0.21 part by weight of color premix were added to the jacketed kettle. These ingredients were then stirred until completely mixed.

A marshmallow mixture or marshmallow syrup was prepared by adding the gelatin mix prepared in the first jacketed kettle to the mallow premix in the second jacketed kettle. These ingredients were then thoroughly mixed until the mixture was substantially uniform throughout with regard to each of the ingredients. The ingredients were then circulated through a heat exchanger and the temperature was reduced to about 75° F. and maintained constant at that temperature. This mixture will hereinafter be referred to as the "marshmallow mix."

A chocolate liquor was prepared by melting blocks of chocolate in a chocolate holding tank and maintaining the melted chocolate at 92° F.±2° F. The chocolate had a cocoa butter fat content of just over 50 percent by weight. The chocolate liquor was maintained at the temperature of 92° F.±2° F. in the chocolate holding tank for inclusion in the process.

The marshmallow mix was introduced in a continuous stream into an Oakes continuous marshmallow mixer and beater (The E. T. Oakes Corp., Islip N.Y.). The mixer was so adjusted that the aerated marshmallow mixture leaving the mixer was at a temperature of 85° F.±3° F. Air was injected into the mixer, and the flow rate and pressure of the air were adjusted until samples of the product exposed to atmospheric pressure had a density of about 45 to 55 ounces per gallon. The pressure of the aerated mixture leaving the mixer was found to fluctuate within the range of 40 to 60 p.s.i.g.

A liquor extruder was designed consisting of a larger pipe or die with a series of smaller pipes or dies extending into the larger pipe and terminating therein. The larger pipe of the liquor extruder was connected to the mixer such that the pressurized, aerated marshmallow mixture passed from the mixer into and through the larger pipe or die of the liquor extruder. The smaller pipes or dies of the liquor extruder were connected to a pump which conveyed melted chocolate from the chocolate holding tank into and through the liquor extruder. The pump was adjusted such that it conveyed 4.75 parts by weight of the melted chocolate into the aerated marshmallow mixture uniformly and evenly. The larger pipe leaving the liquor extruder then contained pressurized, aerated mashmallow mixture having about 4.74 percent by weight chocolate therein, the chocolate being in the form of a series of small continuous ribbons or rods, and the chocolate being uniform in amount therein.

The chocolate and marshmallow mixture was conveyed from the liquor extruder under pressure to the blender. For the blending operation, a blender (identified as Ice Cream Fruit Feeder Blender, Model No. 24, Fruit Feeder Blending Chamber, Cherry-Burrell Corp., Chicago, Ill.) was connected to the system. The blender was adjusted to give a speed of 173 r.p.m. The chocolate and marshmallow mixture uas conveyed from the liquor extruder to the blender and blended therein for a total residence or blending time of from 1 to 3 seconds. The product was sampled as it left the blender and found to be a uniform mixture of chocolate and marshmallow. When exposed to atmospheric pressure, the chocolate marshmallow product had an average density of about 50 ounces per gallon.

The uniformly blended mixture was conveyed from the blender to a depositor where the pressure was reduced to atmospheric pressure and where it was cast as a filler between cookie-type wafers. Upon examination, the chocolate marshmallow product was found to have approximately the following properties:

Chocolate content—4.75 percent by weight
Cocoa butter fat content—2.38 percent by weight
Moisture content—28 percent by weight
Density—50 ounces per gallon
Taste—Sweet, mild chocolate flavor
Texture—Firm, moist, spongy and characteristic of marshmallow
Color—Medium dark with chocolate uniformly and evenly distributed It may thus be seen that we have created and made possible a new and unique process and a new and unique product. Our new process and chocolate marshmallow product significantly advance the known marshmallow technology.

Therefore, we claim:

1. A process for producing chocolate marshmallow comprising the steps:
   (A) preparing a marshmallow mix;
   (B) aerating the marshmallow mix under gas pressure to provide a gas-containing mixture having a density at atmospheric pressure of from 30 to 74 ounces per gallon;
   (C) uniformly injecting from 2 to 15 percent by weight, based on the total weight of the mixture, of a high-fat-content chocolate into the gas-containing mixture, said high-fat-content chocolate being injected in the liquid state, and said high-fat-content chocolate being injected at a pressure above the pressure of the gas containing mixture;
   (D) folding the chocolate and gas-containing mixture to uniformly blend the chocolate therein and create a uniformly blended mixture; and
   (E) reducing the pressure of the uniformly blended mixture to substantially atmospheric pressure, said pressure being reduced before the density at atmospheric pressure of said uniformly blended mixture exceeds 74 ounces per gallon, and said reduction of pressure producing a sponge-like chocolate marshmallow product.

2. A process as in claim 1 wherein said gas-containing mixture has a density at atmospheric pressure of from 35 to 48 ounces per gallon and wherein said high-fat-content chocolate is injected in an amount of from 4 to 7 percent by weight based on the total weight of the mixture.

3. A process as in claim 1 wherein the marshmallow mix is aerated under a gas pressure of from 40 to 60 p.s.i.g., wherein the density at atmospheric pressure of said gas-containing mixture is from 35 to 48 ounces per gallon, wherein the high-fat-content chocolate is injected in an amount of from 4 to 7 percent by weight, wherein said high-fat-content chocolate is injected at a temperature of from 86 to 95° F. and at a pressure of from 40 to 80 p.s.i.g., and wherein the pressure of said uniformly blended mixture is reduced to atmospheric pressure before the density of said uniformly blended mixture at atmosperic pressure exceed 48 ounces per gallon.

4. A marshmallow product having a high-fat-content chocolate uniformly incorporated therein, said marshmallow product having a cocoa butter fat content of from 1 to 8.5 percent by weight, and said marshmallow product having a density of from 30 to 74 ounces per gallon and produced by the process according to claim 1.

References Cited

UNITED STATES PATENTS

| | | | |
|---|---|---|---|
| 1,859,240 | 5/1932 | Jordan | 99—134 |
| 2,171,244 | 8/1939 | Otterbacher | 99—134 |
| 2,847,311 | 8/1958 | Doumak et al. | 99—134 |
| 2,883,286 | 4/1959 | Musser | 99—139 |

JOSEPH M. GOLIAN, Primary Examiner

U.S. Cl. X.R.

99—23